(12) United States Patent
Sun et al.

(10) Patent No.: US 8,273,247 B2
(45) Date of Patent: Sep. 25, 2012

(54) WATER RECLAMATION WITHOUT BIOSLUDGE REPRODUCTION

(75) Inventors: Darren Delai Sun, Singapore (SG); Choon Teck Hay, Singapore (SG); Swee Loong Khor, Singapore (SG); James O. Leckie, Stanford, CA (US)

(73) Assignees: Nanyang Technological University, Singapore (SG); The Board of Trustees of the Leland Stanford Junior University, Palo Alto, CA (US)

( * ) Notice: Subject to any disclaimer, the term of this patent is extended or adjusted under 35 U.S.C. 154(b) by 403 days.

(21) Appl. No.: 12/516,557

(22) PCT Filed: Nov. 28, 2007

(86) PCT No.: PCT/SG2007/000410
§ 371 (c)(1),
(2), (4) Date: Jan. 25, 2010

(87) PCT Pub. No.: WO2008/066497
PCT Pub. Date: Jun. 5, 2008

(65) Prior Publication Data
US 2010/0140167 A1  Jun. 10, 2010

Related U.S. Application Data

(60) Provisional application No. 60/867,508, filed on Nov. 28, 2006.

(51) Int. Cl.
*C02F 3/30* (2006.01)

(52) U.S. Cl. ..... 210/605; 210/622; 210/630; 210/321.6; 210/912

(58) Field of Classification Search .......... 210/605, 210/620, 621, 622, 623, 630, 321.6, 416.1, 210/912
See application file for complete search history.

(56) References Cited

U.S. PATENT DOCUMENTS

| 5,254,253 A | 10/1993 | Behmann | 210/607 |
| 6,361,695 B1 * | 3/2002 | Husain et al. | 210/614 |
| 6,517,723 B1 | 2/2003 | Daigger et al. | 210/605 |
| 2003/0178364 A1 | 9/2003 | Yum et al. | 210/623 |
| 2008/0223783 A1 * | 9/2008 | Sutton | 210/621 |

FOREIGN PATENT DOCUMENTS

JP  06181645  7/1994

OTHER PUBLICATIONS

Derwent Abstract Accession No. 2006-410917, KR 2005063478, Jun. 28, 2005.
Egemen et al., "Evaluation of an ozonation system for reduced waste sludge generation," *Water Science and Technology* 44(2-3): 445-452, 2001.
Huang et al., "Effect of sludge retention time on microbial behaviour in a submerged membrane bioreactor," *Process Biochemistry* 36: 1001-1006, 2001.

* cited by examiner

*Primary Examiner* — Fred Prince
(74) *Attorney, Agent, or Firm* — Seed IP Law Group PLLC

(57) ABSTRACT

An apparatus for cleaning of wastewater comprising a submerged membrane biological reactor system (MBR) and a submerged membrane module (MBD) wherein the MBR is in fluid communication with the MBD for feeding excess sludge from the MBR to the MBD and wherein the MBR comprises an outlet which releases permeate passed through the membrane of the MBR and the MBD is in fluid communication with the MBR for feeding permeate passed through the membrane of the MBD back into the MBR and comprises an outlet for releasing gas.

11 Claims, 4 Drawing Sheets

WATER RECLAMATION WITHOUT BIOSLUDGE REPRODUCTION

CROSS-REFERENCE TO RELATED APPLICATIONS

This application claims the benefit of priority of U.S. provisional application No. 60/867,508, filed Nov. 28, 2006, the contents of which is hereby incorporated by reference in its entirety for all purposes.

FIELD OF THE INVENTION

The invention refers to a process and apparatus for cleaning wastewater with no production of biosludge.

BACKGROUND OF THE INVENTION

Wastewater treatment is the largest biotechnology industry in the world. This industry handles and disposes domestic and industrial wastes so they present no threat to the population and the environment.

The treatment of sewage or wastewater is most commonly first done in primary clarification (settling) tanks where the solids which settle are removed before the partially treated wastewater is then fed for secondary treatment in a biological treatment plant, where microorganisms degrade and stabilize the organic wastewater to biomass (sludge), water and gases.

The microorganisms that grow on the substrate in the wastewater are separated from the water by further settling of the "reacted" wastewater in the biological tanks, which has carbon substrates measured as biochemical oxygen demand (BOD) or chemical oxygen demand (COD), leaving a relatively clean effluent as the treated effluent. The treated effluent will then be discharged into open waters or send for further tertiary treatment or for reuse. This biological treatment is by, far the most common treatment process for municipal and industrial wastewaters.

Most biological treatment plants now use the conventional activated sludge process (CAS). CAS has proved useful for the treatment of many organic wastes which were at one time thought to be toxic to biological systems. This process is a treatment technique in which wastewater and reused biological sludge full of living microorganisms is mixed and aerated. The mixture formed of wastewater and biological sludge is designated as mixed liquor. After the mixed liquor has been formed in the aeration tank of an activated sludge process (CAS), excess mixed liquor is discharged into settling tanks and the treated supernatant is run off to undergo further treatment before discharge. Part of the settled material, the sludge, is returned to the head of the aeration system to re-seed the new sewage or wastewater entering the tank. "Excess sludge" which eventually accumulates beyond what is returned is removed from the treatment process to keep the ratio of biomass fed to sewage or wastewater (F/M ratio) in balance.

However, the activated sludge process has a large footprint due to the need for large aeration tanks and clarifier tanks. The consistency of the effluent quality will be dependent on the bioprocess especially sludge bulking which caused serious problems to the operation of the activated sludge process (CAS) and greatly reduced the quality of the effluent.

In conventional activated sludge (CAS) systems, biomass separation from the biologically treated effluent relies on gravitational settling of aggregated mixed microbial flocs. Good separation is highly dependent on the flocculating characteristics of the mixed bacteria population. As the settling abilities of the biomass are relatively poorer at high biomass concentrations, the biomass concentrations in the CAS treatment process are usually limited to 5 g/l. In addition, the CAS wastewater treatment process also generates large quantities of excess sludge due to a shorter sludge retention time (SRT), normally in the region of 5-15 days. The treatment and disposal of this "excess sludge" usually represent 50-60% of the total cost for CAS wastewater treatment plant (Egemen, E., Corpening, J., Nirmalakhandan, N., 2001, Water Sci. Technol., vol. 44(2-3), p. 445-452). These drawbacks can be largely circumvented if the biomass is completely or almost completely retained. This leads researchers into the study of more efficient and cost effective wastewater treatment techniques in recent years.

A membrane bioreactor or submerged membrane biological reactor system (MBR) has been paid increasing attention in recent years for its advantages over the CAS wastewater treatment. By replacing the settling tank of a CAS with a membrane filtration device in an MBR, the biomass concentration can be increased, leading to high organic loading, compact model structure system and low sludge production, i.e. also a lower amount of excess sludge which would need to be deposited (Huang, X., Gui, P., Qian, Y., 2001, Process Biochemistry, vol. 36, p. 1001-1006). An MBR uses microporous or ultraporous membrane module(s) to separate the sludge from the activated sludge process (CAS). Therefore, clean water permeates from the one side of the membrane to the other side of the membrane and suspended solids (SS), bacteria and viruses are retained in the bioreactor membrane tank of the MBR.

Furthermore, in an MBR, the high level of mixed liquor suspended solids (MLSS) effectively achieves nitrification and denitrification without the need for extended aeration. Another advantage of the use of membrane filtrations is the indifference to hydraulic fluctuations. Theoretically, a MBR runs at a very low F/M ratio and is supposed to achieve a low sludge production. Applying the MBR with no sludge discharge in industrial application, however, is still not possible.

Thus, to avoid unnecessary sludge production, it is important to further improve the existing systems for cleaning sewage or wastewater.

SUMMARY OF THE INVENTION

In a first aspect the present invention is directed to an apparatus for cleaning of wastewater comprising:
  a submerged membrane biological reactor system (MBR); and
  a submerged membrane module (MBD);
  wherein
  the MBR is in fluid communication with the MBD for feeding excess sludge from the MBR to the MBD, and wherein the MBR comprises an outlet which releases permeate passed through the membrane of the MBR; and
  the MBD is in fluid communication with the MBR for feeding permeate passed through the membrane of the MBD back into the MBR and comprises an outlet for releasing gas.

A process for cleaning wastewater using an apparatus according to any of the preceding claims, wherein the process comprises:
  feeding wastewater to be treated into a MBR;
  feeding excess sludge from the MBR into a MBD;
  dispersing the excess sludge in the MBD;
  feeding permeate passed through the membrane of the MBD back into the MBR;

releasing permeate passed through the membrane of the MBR; and releasing $CO_2$ produced in the MBD.

BRIEF DESCRIPTION OF THE DRAWINGS

The invention will be better understood with reference to the detailed description when considered in conjunction with the non-limiting examples and the accompanying drawings, in which:

FIG. 2 indicates feeding pumps (27, 28, 14 and 15) which are pumping liquid and/or sludge from one tank to the next one.

DETAILED DESCRIPTION OF THE INVENTION

Figure 1:
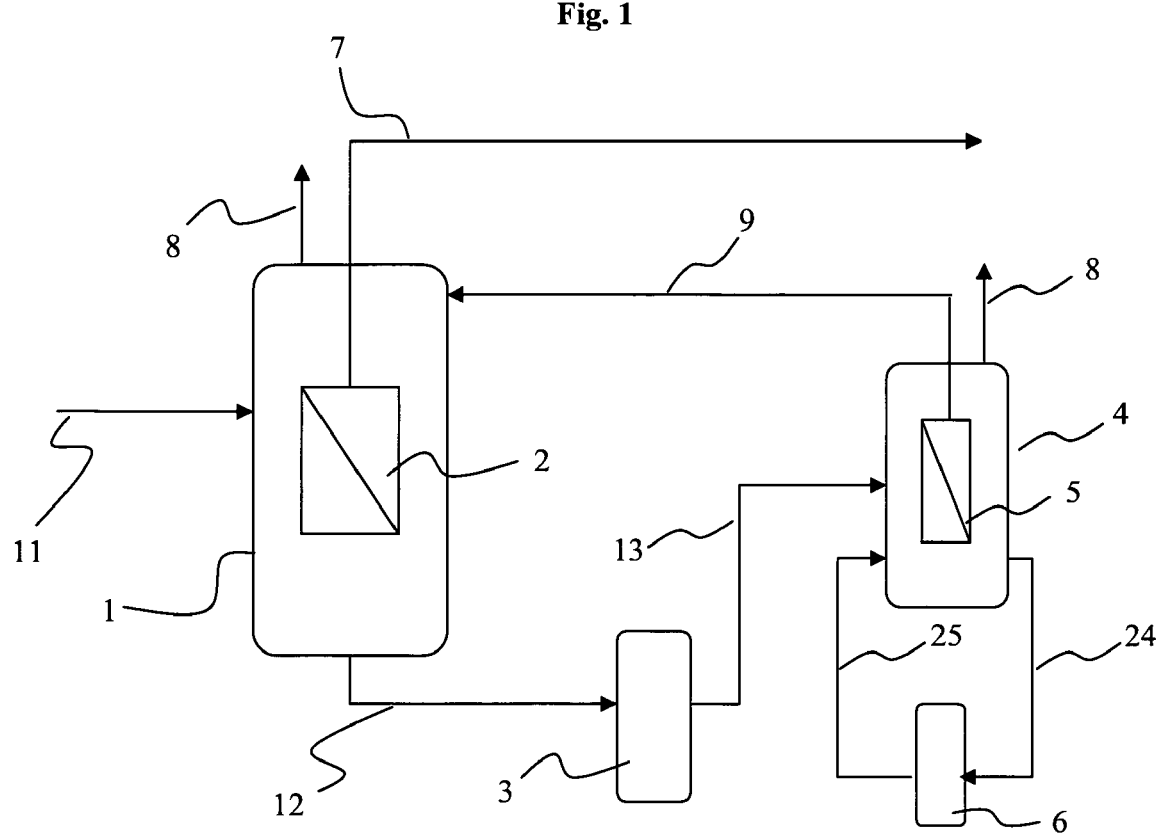
FIG. 1 shows a schematic overview of a wastewater reactor of the present invention. Illustrated are the main components of an apparatus for cleaning wastewater inclusive the optional components like the pretreatment reactor (3) and the element balancing reactor (6). Also indicated are the filtration membranes (2) and (5) in the MBR system and the MBD. Further disclosed are the fluid communications, e.g. pipes, between the single components of the apparatus as well as the outlets for the gases produced during operation of the apparatus of the present invention.

The fact that the production of excess sludge in a membrane bioreactor or submerged membrane biological reactor system (MBR) can not be avoided completely is due to the lack of understanding of the behavior of microorganism in the system. More dead or inactive microorganisms have been discovered in MBR compared to CAS. It was noted that the total microorganisms and rate of specific nitrification, denitrification and organic removal have been lower than those in the CAS process.

According to biological fundament, the complete sludge retention time (SRT) is supposed to generate more dead or inactive microorganisms in MBR. If so, this controversial issue of complete sludge retention in a MBR is the change in composition of the mixed liquor which may reduce the biological capability. This means the microbial viability becomes more questionable in MBR with complete sludge retention where dead or inactivate microorganisms have no chance at all to be discharged. Beside the issue of dead or inactivate microorganisms in MBR, accumulation of organic suspended solid (SS), especial the soluble microbial product (SMP) or extracellular polymeric substance (EPS) is another major issue in doubt. This accumulation and its impact on membrane fouling and reducing microbial activity has been reported in some MBR systems with short and medium SRTs (5 to 100 days) (Huang, X., Gui, P., Qian, Y., 2001, Process Biochemistry, vol. 36, p. 1001-1006).

In order to provide a system with no production of excess biosludge, the inventors have developed the apparatus and method of the present invention. The apparatus for cleaning of wastewater of the present invention comprises:

a submerged membrane biological reactor system (MBR); and a submerged membrane module (MBD); wherein the MBR is in fluid communication with the MBD for feeding excess sludge from the MBR to the MBD, and wherein the MBR comprises an outlet which releases permeate passed through the membrane of the MBR; and the MBD is in fluid communication with the MBR for feeding permeate passed through the membrane of the MBD back into the MBR and comprises an outlet for releasing gas.

In one example of the present invention, the apparatus of the present invention further comprises a pretreatment reactor, wherein the pretreatment reactor is in fluid communication with the MBR and with the MBD; whereby the excess sludge is fed from the MBR into the pretreatment reactor in which the excess sludge is dispersed with a disperser housed in the pretreatment reactor and is fed into the MBD after dispersing. In case the apparatus of the present invention does not comprise a pretreatment reactor, the MBD is larger than with the pretreatment reactor to allow dispersion of the excess sludge from the MBR system in the MBD. Thus, the pretreatment reactor serves mainly to reduce the size of the MBD in plants where it is not possible to use a large sized MBD.

"Wastewater" or "sewage" includes municipal, agricultural, industrial and other kinds of wastewater. The term "excess sludge" describes the part of the sludge which is removed from the treatment in a MBR because it is not returned to the beginning of the MBR system for re-seeding the new sewage or wastewater entering the tank. Thus, the sludge produced in a MBR system consists of the part used for re-seeding and the excess sludge. The excess sludge comprises the organic sludge (biosludge) and the inorganic sludge. With the apparatus and the method of the present invention it is possible to avoid any production of organic sludge.

Instead of discharging the excess sludge which is normally produced in a MBR system, the excess sludge produced is fed into an additional cycle including a submerged membrane module (MBD) and optionally a pretreatment reactor. In the pretreatment reactor the sludge is conditioned wherein this "conditioning" includes breaking down the sludge flocs size into smaller flocs or particles or even individual bacteria. Subsequently, the pretreated sludge is diverted into the MBD for complete removal of organic compound of the sludge. The remaining organic compounds in the excess sludge are converted in the MBD into $CO_2$. The MBD and the membrane filtration tank (MB-tank) of the MBR are the same. The difference lies in the fact that the sludge retention time (SRT) in the MB-tank is shorter than in the MBD. In one non-limiting example, the SRT was 300 days in the MB-tank of the MBR and infinite in the MBD. Thus, due to the infinite SRT condition in MBD, the endogenous metabolism will be the main process in the MBD where the lyses cell is degraded into a smaller portion. This will be contributed to the impurities in the MBD permeate which will be fed back into the MBR. The degradation of organic in the MBD is based on the hydrolysis and endogenous mechanisms by which dead microorganisms in the pretreated sludge are degraded by the remaining active microorganism in the pretreated sludge which are using the dead microorganism as carbon source. Under this starvation conditions in the MBD, most of the energy obtained by the microorganism is used for cell maintenance rather than production of new cells, i.e. reproduction. Hence, this condition reduces the production of new cell and thus the further production of excess sludge which would need to be discharged from the apparatus of the present invention. The still living microorganisms in the sludge transform the biomass into $CO_2$ which is a gas that can be easily removed from the system. As mentioned above, the permeation from the membrane of the MBD is diverted back into the MBR for further polishing before being discharged through the membrane of the MBR. This configuration allows avoiding the production of organic sludge which would need to be discharged and disposed.

The MBR as well as the MBD are under aerobic conditions and use a microporous or ultraporous "membrane" module(s) to separate already treated wastewater from the activated sludge process. A pressure gradient across the membrane forces the liquid to penetrate the membrane. This is achieved by using suction/permeate pumps. Using those pumps a vacuum is applied to a header connected to the membranes. Therefore, clean water permeates from the one side of the membrane to the other side of the membrane and microbial and suspended solids are retained in the bioreactor tank. This does not only mean better permeate quality but also the consistency of the quality. The need for a separate secondary settling tank is also eliminated when using a membrane filtration module in an MBR and/or MBD.

The content of the MBR and/or MBD is preferably kept in a turbulent flow, which is parallel to the membrane's surface. This dispersion prevents particles from depositing on the membrane or carries away already deposited substances. An additional or alternative method to avoid deposition of material on the surface of the membrane is to provide an air blender for membrane scouring which is placed below the membranes. The air blenders will continuously produce large air bubbles to provide a scouring cleaning effect on the membrane modules while clean water is permeated through the membranes continuously at a high rate of yield.

The arrangement for the inlets of the different modules or tanks used in the apparatus of the present invention can be located at the upper end of the modules or tanks or at the lower end, i.e. close to the bottom of the module or tank. This modification permits, in addition to the turbulence created by the introduced gas or dispersers in the module or tank, further agitation of the liquid in the module or tank by virtue of the liquid flowing from the bottom toward the top.

In addition, the MBR and/or MBD can comprise aerator(s) for oxygen diffusion to provide efficient air supply. Other than the air blender, the aerator(s) for oxygen diffusion produce much smaller air bubbles. In general, smaller air bubbles allow better oxygen enrichment in the mixed liquor than larger air bubbles due to their bigger surface area.

The apparatus of the present invention can also comprise stirrer or mixer in the MBR and/or MBD to allow a better agitation, i.e. turbulent flow within the tanks.

The MBR and/or MBD of the apparatus of the present invention can also comprise backwash pumps for the membranes located in the MBR and/or MBD. A backwash pump is used to periodically create positive pressure within the membrane core to pump permeates back in reverse direction from the inside of the membrane to the outside of the membrane to remove sludge material which clogs the pores of the membrane. The use of a backwash process as well as aeration of the membrane by use of the aerators referred to above allow continuous operation of the submerged membrane(s), i.e. without taking them out of the system for maintenance, and avoid fouling of the membrane.

Porous filtration membranes for use in wastewater plants are known in the art and have in general a pore diameter of about 0.01 µm to about 1 µm and are made of different kinds of polymers or ceramics. Examples of polymers which are used for such filtration membranes are cellulose acetate, polyamide, polysulphone, polypropylene, polytetrafluoroethylene (PTFE). Examples of ceramics which are used for such filtration membranes are diatom earth, aluminium oxide, titanium oxide, titanium dioxide or zinc oxide.

In one non-limiting example of the present invention, the membrane is made of ceramics, namely diatom earth of the MF type (Doulton, USA).

An exemplary overview of a possible configuration of an apparatus of the present invention is provided in FIG. 1. As can be seen from this Figure, wastewater is fed through an inlet (11) into the MBR system (1) comprising a submerged membrane (2). The high quality permeate filtered through the membrane (2) of the MBR (1) is released back into the natural water cycle via an outlet (7). The excess sludge produced in the MBR (1) is fed via a connection (12) into the pretreatment reactor (3) in which the sludge is conditioned before it is fed via the connection (13) into the MBD (4). The MBD (4) comprises an outlet for releasing $CO_2$ (8) which is produced in the MBD when the pretreated excess sludge is decomposed. The low quality permeate filtered through the membrane (5) of the MBD (4) is fed back into the MBR system (1) via the outlet (9).

In one aspect of the invention, the pretreatment reactor (3) comprises a disperser which can be selected from the group consisting of an agitator and an ultrasonic transducer for conditioning the sludge, i.e. breaking and dispersing the sludge from the. The MBD (4) comprises a submerged membrane (5) through which water is filtered which is then fed back into the MBR (1) via the outlet (9).

Also disclosed in FIG. 1 is the element balancing reactor (6) which can also be comprised in the apparatus of the present invention. The use of the element balancing reactor (6) is optional. The element balancing reactor allows removing of heavy metals from the sludge of the MBD (5) if necessary. In a non-limiting example, about 1/300× of the working volume of the MBR (e.g. 20 l) per day was discharged from the MBR into the MBD. The element balancing reactor (6) is fed with the sludge from the MBD (4) via the connection (24) when the content of heavy metals in the sludge of the MBD is too high. After chemical separation of the heavy metals from the sludge fed into the element balancing reactor (6), the remaining sludge is fed back into the MBD (4) via the connection (25).

Figure 2:
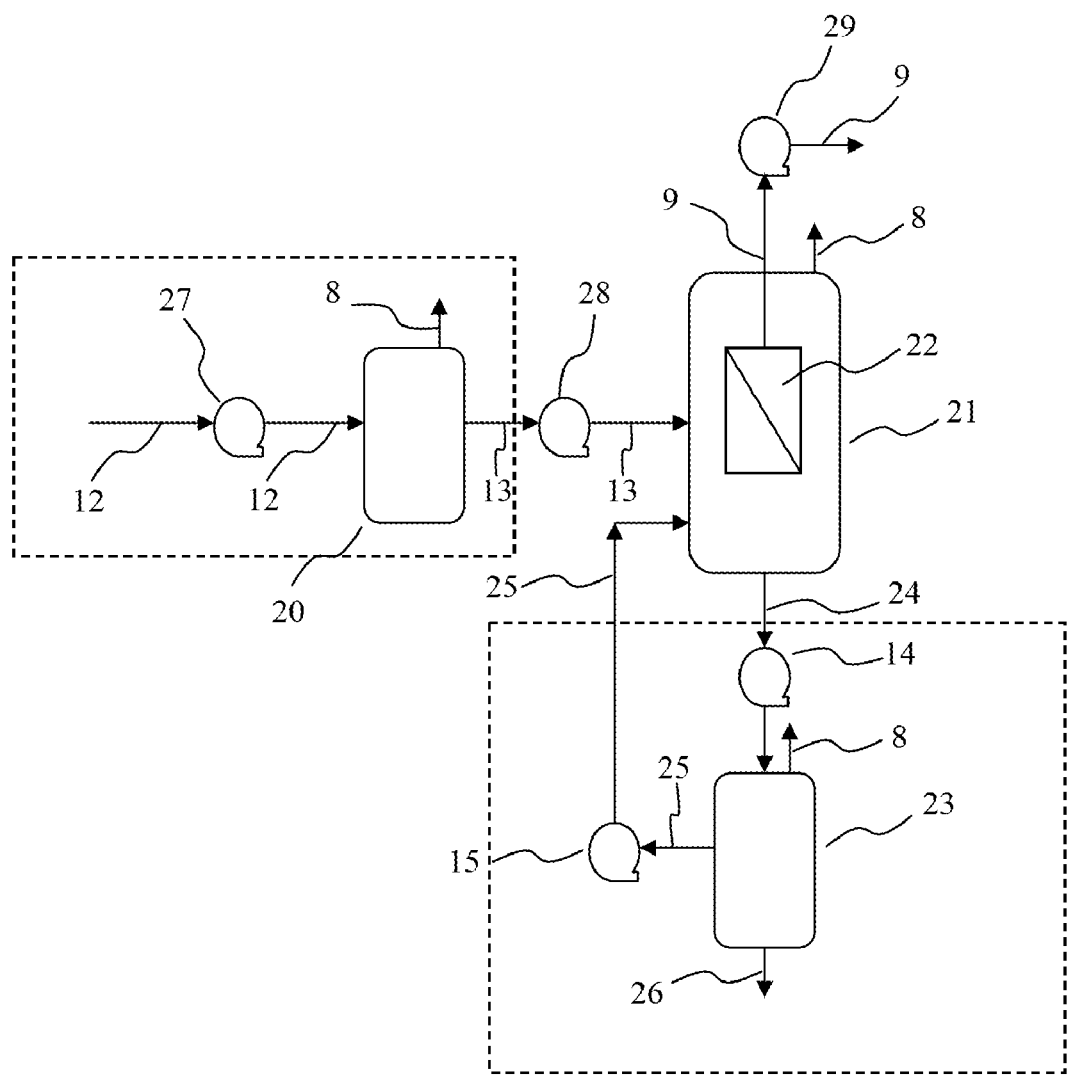
FIG. 2 shows a more detailed overview of the element balancing reactor (23), the pretreatment reactor (20) and the MBD (21). The rectangular boxes with the dotted lines indicate that the pretreatment reactor (20) and the element balancing reactor (23) are optional.

In FIG. 2 it can be seen that firstly, some portion of biosludge is transferred from the MBD (21) to element balancing reactor (23) via the connection (24) and the pump (14). This transfer takes place when for example the ratio of mixed liquor volatile suspended solids/mixed liquor suspended solids is below 0.5 or upon deterioration of TOC removal or high metal concentration in mixed liquor. Second, an acid solution is added into the element balancing reactor (23) to dissolve the inorganic (heavy metals) compounds. Any kind of acid solution can be used for this purpose. A few examples for acids would be HCl, $H_2SO_4$ or $HNO_3$. Third, a centrifugation is conducted, either offline or inline, to separate the biosludge (organic sludge) and liquid (with soluble inorganic compounds: inorganic sludge) from each other. Fourth, the biosludge is neutralized with base solution to pH 7 and transferred back to the MBD (21) via the connection (25) and the valve (15) for further processing. Fifth, base solution is added, either offline or inline, to the liquid with soluble inorganic compounds to precipitate the inorganic compounds using standard protocols known in the art. Any kind of base solution can be used. One example for a base solution would be NaOH. Sixth, a centrifugation is conducted to separate the liquid and precipitate inorganic compounds. Finally, the separated liquid is transferred back to MBD (21), while precipitated inorganic compounds are disposed as chemical inorganic sludge.

In one aspect, the EBR provides a further outlet for removing heavy metals separated from the sludge of the MBD.

It is characteristic for the wastewater used in the apparatus of the present invention that through human activities excessive amounts of nutrients (primarily phosphorous, nitrogen and carbon) are comprised in this wastewater. One of the key nutrients, nitrogen is often introduced excessively to the environment through untreated wastewater.

High levels of nitrogen can result in eutrophication of receiving waters which is characterized by excessive "blooms" of algae (e.g. phytoplankton) promoted by these nutrients changed water quality. These algal blooms led to oxygen depletion and disappearance of native fish species. Beaches and shorelines are fouled by masses of rotting, stinking algae. To prevent these conditions, many jurisdictions have started to regulate the amounts of total nitrogen that may be discharged from wastewater treatment plants.

To remove ammonia and total nitrogen from wastewater, bacteria in a bioreactor are used to alternately nitrify and denitrify the water. During "Nitrification", a two step process converts ammonia into nitrites and nitrates. Firstly, nitrifying bacteria (*Nitrosomonas*) will oxidize the ammonia and convert it to nitrite. Secondly, another genus of nitrifying bacteria in tandem (*Nitrobacter*) will then oxidize the nitrite and convert it to nitrate. Since oxidation occurs in both steps of the nitrification process, an aerobic environment is required.

During "denitrification", nitrate is converted to ammonia and nitrogen gas by denitrifying bacteria which remove oxygen from the nitrate. However, an anoxic condition will be needed to encourage the growth of such bacteria. Nitrogen gas, an inert gas will be produced as end product after the nitrification and denitrification stage are completed. This will therefore reduce the total nitrogen level in the wastewater.

During conventional biological treatment, the complex organic nitrogen forms are only partially oxidized to produce nitrites and nitrates which are also hazardous to the natural environment. Slow growth of the nitrifying bacteria also limits the efficiency of the conventional activated sludge process.

The apparatus and the method of the present invention are designed to allow efficient nitrification as well as denitrification. These steps take place in the submerged membrane biological reactor system (MBR). It is possible to carry out those steps in a single tank MBR system as previously described in JP 6-181645 in which alternating aerobic and anoxic conditions have been provided.

JP 6-181645 describes a single tank membrane bioreactor for treating nitrogen by alternating aerobic and anoxic conditions by regulating the air supply off and on. In one aspect, an attempt was made to continue to permeate effluent through the membranes during the anoxic phase. Each anoxic phase was started with a minimum level of mixed liquor in the bioreactor and the level of mixed liquor was allowed to rise to a maximum level by the end of the anoxic phase so that a reduced amount of permeate could be withdrawn during the anoxic phase.

In another mode of operation disclosed in JP 6-181645, aeration was again used during an aerobic period and then stopped to allow an anoxic phase to begin. Permeation through the membranes was stopped at the beginning of the anoxic phase but resumed after the mixed liquor had settled to the bottom of the bioreactor.

In another aspect of the present invention, a submerged membrane biological reactor system (MBR) is comprised of three separated compartments in a single unit for holding mixed liquor to be treated, wherein
 a first compartment has an inlet for wastewater and is in fluid communication with the second compartment, wherein the first compartment allows removal of carboneous compounds and nitrification under aerobic conditions;
 a second compartment allows denitrification under anoxic conditions and is in fluid communication with the third compartment; and
 a third compartment providing aerobic conditions, comprises the submerged membrane having an outlet which releases permeate passed through the membrane, and the third compartment is in fluid communication with the pretreatment reactor.

The third compartment also comprises an outlet to feed sludge from the third compartment back into the first compartment for re-seeding the new sewage or wastewater entering the first compartment.

The first aerobic compartment is for removing of BOD/COD (organic compounds) and promotes nitrification of the wastewater, while the second compartment is an anoxic reactor which allows removal of nitrite/nitrate (denitrification). High quality clean water (permeate) is continuously withdrawn from the last compartment, an aerobic submerged membrane module and sludge is returned back to the beginning of the MBR process. The excess sludge is, as described above, fed into the pretreatment reactor.

In another aspect, the present invention refers to a process for cleaning wastewater using an apparatus of the present invention, wherein the process comprises:
 feeding wastewater to be treated into the MBR;
 feeding excess sludge from the MBR into the MBD;
 dispersing the excess sludge in the MBD to obtain dispersed sludge providing a greater surface than the sludge which was fed from the MBR into the MBD;
 feeding permeate passed through the membrane of the MBD back into the MBR;
 releasing permeate passed through the membrane of the MBR; and
 releasing $CO_2$ produced in the MBD.

In another example of the present invention, the method further comprises:
 feeding excess sludge from the MBR into a pretreatment reactor;
 dispersing the excess sludge in the pretreatment reactor; and
 feeding the dispersed sludge from the pretreatment reactor into the MBD.

In another aspect of the present invention, the excess sludge produced in the MBD is fed into the element balancing reactor for removing heavy metals from the sludge and is then fed back into the MBD.

Figure 3:
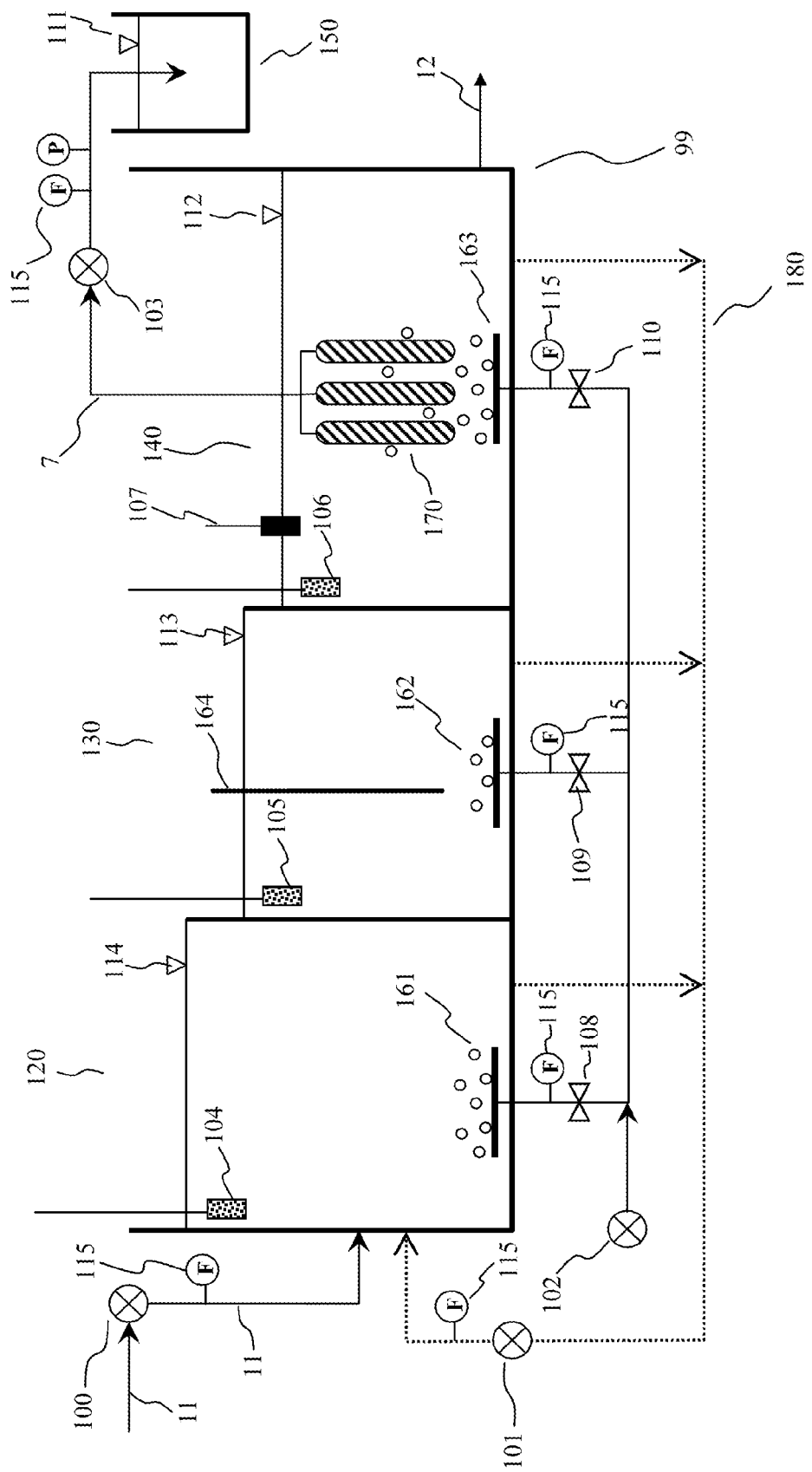
FIG. 3 shows a more detailed overview of the MBR system (99) with the three separate tanks (120, 130, 140). The arrow (12) indicates the connection to the MBD (21) whereas the line (11) indicates the point at which the wastewater enters the MBR system of the apparatus of the present invention.
Figure 4:
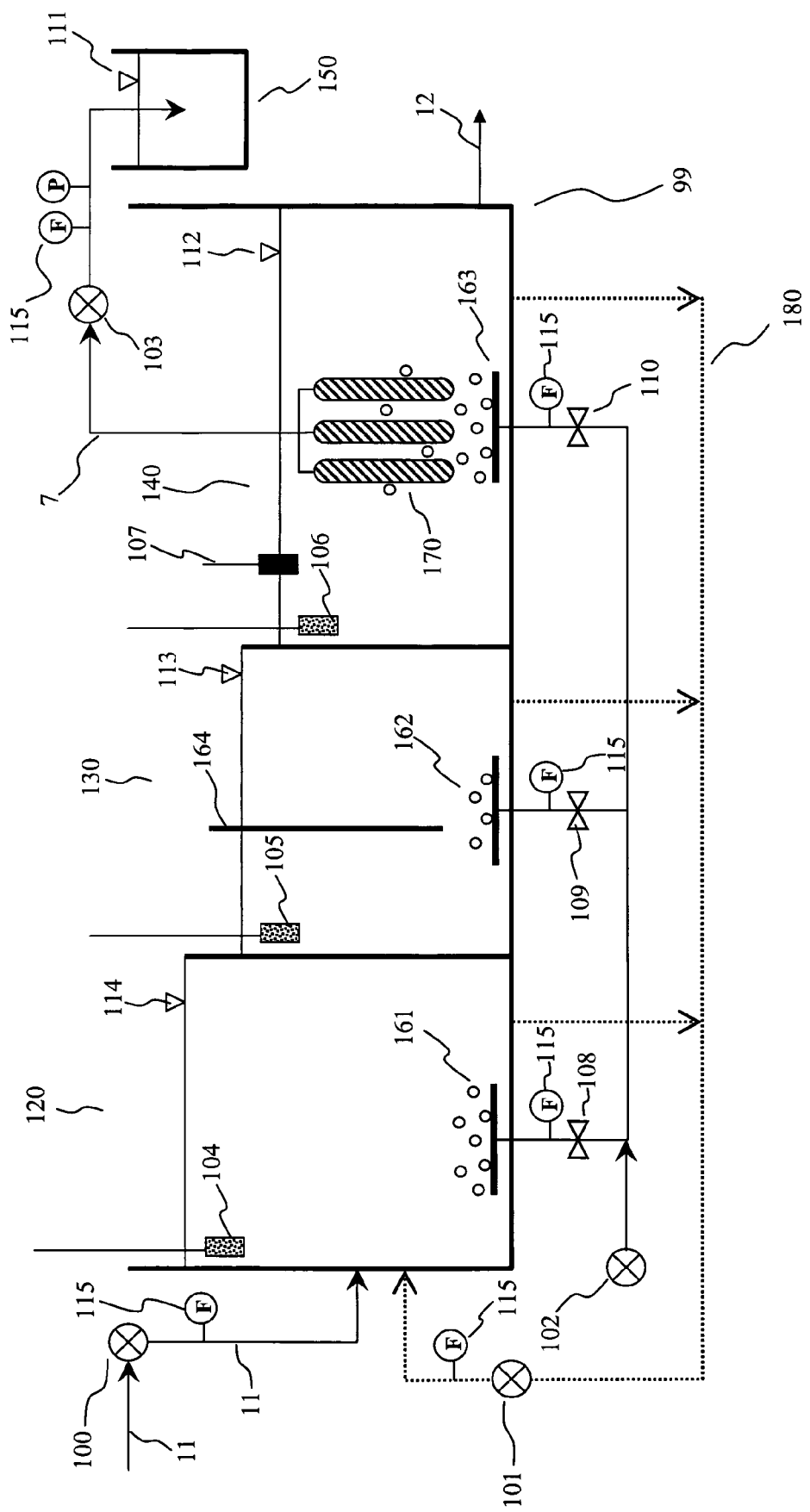

FIG. 3 shows a detailed schematic diagram illustrating a possible set-up of a MBR comprising several tanks instead of one tank according to one aspect of the present invention. The bioreactor is separated into three different compartments by baffles. The first compartment is named the chemical oxygen demand (COD) removal tank (COD-tank) (120). The second compartment is named the nitrogen removal tank (N-tank) (130) and the third compartment is named the membrane filtration tank (MB-tank) (140). In one possible example, those tanks have working volumes of 6 l, 4 l and 10 l, respectively. Aeration (161, 163) is provided in the COD-tank (120) and the MB-tank (140). The oxygen level in the COD-tank is equal or more than about 2 mg/l. The oxygen level in the MB-tank is equal or more than about 1.5 mg/l. The aeration in the COD-tank (120) and the MB-tank (140) also provide mixing, while the aeration intensity is higher in the MB-tank (140) to generate higher crossflow and provide additional scouring of membrane surfaces (170) to reduce fouling. Intermittent low intensity aeration (162) is provided for the N-tank (130) to stimulate anoxic conditions, i.e. keep oxygen level below 0.5 mg/l or 0.2 mg/l. Since aeration in the N-tank (130) is intermittent, an overhead mixer (164) is used to provide the continuous mixing in the N-tank (130). All aerations can be supplied by compressed air or oxygen from an air blower (102) to the diffuser (161, 162, 163) located at the bottom of each compartment (120, 130, 140). Air flowrates to the diffusers (161, 162, 163) in the individual compartments (120, 130, 140) can be measured using the valves (108, 109, 110) and digital air flowmeters (115).

An ultrasonic level sensor (107) is used to control the water level in the MB-tank (140) in order to assure that the water level in the MB-tank (140) is maintained at a constant total volume in the module. This is necessary to ensure that the membrane(s) (170) of the MB-tank (140) are continuously submerged. Upon detection of lower level, the sensor (107) will signal via a programmable logic controller (PLC) unit for the influent pump (113) to start and wastewater will be fed into the MBR via the feed pump (100).

Initially, wastewater is fed from a wastewater holding tank (not shown) into the COD-tank via the connection (11). At the same time activated sludge is filled in the compartments of the MBR to initiate biological process. This sludge can be introduced from another MBR system or from the present MBR system by using sludge produced in one of the tanks (120, 130, 140) which is fed back into the COD-tank (120) via the connecting tube (180). From FIG. 3 it can be seen that the wastewater is fed through the COD-tank (120), where nitrification takes place under aerobic conditions, before overflowing into the N-tank (130). In the N-tank (130) nitrates and nitrites are reduced to nitrogen gas under anoxic conditions. Afterwards, the treated wastewater, i.e. mixed liquor is overflowing into the MB-tank (140) where permeation will take place. If not by passive overflowing, the content of each tank (120, 130, 140)) can also be actively pumped into the next tank by using pumps (111), (112), (113) and (114).

The membrane modules (170) are placed in the centre of the MB-tank (140) to ensure maximum contact with the coarse air bubbles to alleviate the fouling phenomenon commonly encountered at the membranes (170) of a MBR. The membrane modules are kept submerged in the mixed liquor and the level in the MB-tank (140) is always kept at a fixed level above the membrane modules (170) by a level sensor (107) controlling the feed pump (113) to add feed water from the second compartment (130) as necessary. The three units of ceramic membranes (170) indicated in FIG. 3, can be of MF type and can have an effective pore size of 0.9 μm. The surface area of each membrane would then be 0.0024 m². However, other pore sizes and surface areas for the membrane are possible depending on the specific application and the nature of the wastewater fed into the plant.

The hydraulic retention time of each compartment makes up the total hydraulic retention time (HRT). Dissolved oxygen (DO) and pH are measured using online DO and pH probes (104, 105, 106). A suction pump or vacuum pump (both 103) can be used to obtain the membrane (170) filtered permeate. The HRT of the system is controlled by the permeate flux. The system also comprises a backwash pump (not shown) for the backwashing phase of the membrane module. The flowrates are measured using digital flowmeters with signal feedback to the PLC. The transmembrane pressure is measured using a digital pressure switch which is also equipped with signal feedback.

The excess sludge from the MBR (99) is fed into the pretreatment reactor (3, 20) via the connection (12) and the pump (27). The incoming excess sludge is conditioned in the pretreatment reactor (3, 20) and will be broken into smaller flocs/individual bacteria, for example by sonication at a frequency of 20 kHz and a sonication density of 0.18 W/ml. Subsequently, the conditioned sludge is diverted into the MBD (4, 21) via the connection (13) and the pump (28) for complete removal of organic compounds from the pretreated sludge in the MBD (4, 21). Lastly, the low quality permeate from the filtration membrane (5, 22) of the MBD (4, 21) is diverted back into the MBR system (99) via the connecting line (9) and the pump (29) for further polishing before being discharged. In addition, element balancing reactor (6, 23) can be activated once the accumulation of inorganic compound occurs in the MBD (4, 21).

In one example, the apparatus of the present invention is fed with diary wastewater. In one example the apparatus of the present invention was fed with wastewater from the Singapore Jurong Wastewater Reclamation Plant and assimilated for four weeks to the industrial wastewater before the treatment in the apparatus of the present invention. The characteristics of the industrial wastewater used are listed in Table 1.

TABLE I characteristics of the industrial wastewater

| Component | Concentration |
| --- | --- |
| COD (mg/l) | 1000 |
| Soluble COD (mg/l) | 543 |
| Particulate COD (mg/l) | 456 |
| Total organic carbon (TOC) (mg/l) | 334 |
| Soluble TOC | 209 |
| Total nitrogen (TN) (mg/l) | 10 |
| Total phosphorus (TP) (mg/l) | 1.35 |
| pH | 7.0-7.5 |
| Suspended solids (SS) (mg/l) | 200 |
| Volatile suspended solids (VSS) (mg/l) | 197 |

After 120 days of operation, the concentration of mixed liquor suspended solids (MLSS) stabilizes at an approximately value of 12,000 mg/l. The table bellows summarizes the characteristics of the feedwater and the permeate.

|  | Feedwater | Permeate |
| --- | --- | --- |
| COD (mg/l) | 1000 | >10 |
| TOC (mg/l) | 334 | >3 |
| Turbidity (NTU) | 330 | >0.15 |
| Total Nitrogen (mg-N/L) | 20 | >0.25 |

Thus, the MBR system demonstrates strong ability to effectively remove carbon when COD reduction in the permeate is more than 99%. The reactor is also very effective in removing nitrogen as total nitrogen level in the permeate drops to less than 0.25 mg/l which is even below the drinking water standards.

The MBD is fed with biosludge and operated with a hydraulic retention time of 10 days and the aim of complete sludge retention. In one example, the tank has a working volume of 10 liters but has a total volume of 20 liters when no pretreatment tank is used. In this example, the dissolved oxygen (DO) concentration in the reactor was kept at above 3 mg/l, which designed to provide aerobic condition. The membranes which can be used are of ceramic materials and microporous type with an effective pore size of 0.9 microns.

The biosludge loading of the feed in the MBD is 0.15 kg MLSS per cubic meter per day. There is complete sludge retention in the system which means no sludge is wasted except for testing purposes that only amount to a very small percentage of the total sludge in the system. After 120 days of operation, the concentration of MLSS in the MBD stabilizes at an approximately value of 15,000 mg/l. The MBD system demonstrates strong ability to effectively remove organic compounds in the biosludge as 99% of the incoming organic compound in the biosludge has been degraded and no accumulation of inorganic compounds can be found.

| List of reference signs: | |
|---|---|
| 1, 99 | MBR system |
| 2, 170 | Filtration membrane in the MBR |
| 3, 20 | Pretreatment reactor |
| 4, 21 | MBD |
| 5, 22 | Filtration membrane in the MBD |
| 6, 23 | Element balancing reactor |
| 7 | Outlet of filtration membrane of MBR system |
| 8 | Outlet for releasing gas |
| 9 | Outlet of filtration membrane of MBD |
| 11 | Feeding pipe, inlet into MBR |
| 12 | Feeding pipe, inlet into element balancing reactor |
| 13 | Feeding pipe into MBD from element balancing reactor |
| 14, 15, 27, 28 | Feeding pump |
| 24 | Feeding pipe from MBD to the element balancing reactor |
| 25 | Feeding pipe from the element balancing reactor to the MBD |
| 29, 103 | Suction pump or vacuum pump |
| 102 | Air blower |
| 104, 105, 106 | DO and pH probes |
| 107 | Ultrasonic level sensor |
| 108, 109, 110 | Valves |
| 110 | Feeding pump for COD tank |
| 111, 112, 113, 114 | Feeding pump |
| 115 | Digital flowmeters |
| 120 | Chemical oxygen (COD) removal tank |
| 130 | Nitrogen removal tank |
| 140 | Membrane filtration tank (MB-tank) |
| 161, 163 | Aeration (diffuser) |
| 162 | Low intensity aeration (diffuser) |
| 164 | Overhead mixer |
| 180 | Feeding pipe from MBR tanks |

The invention claimed is:

1. An apparatus for cleaning of wastewater comprising:
   a submerged membrane biological reactor system (MBR); and
   a submerged membrane module (MBD);
   wherein
   said MBR is in fluid communication with said MBD for feeding excess sludge from said MBR to said MBD, and wherein said MBR comprises an outlet which releases permeate passed through the membrane of said MBR; and
   said MBD is in fluid communication with said MBR for feeding permeate passed through the membrane of said MBD back into said MBR and comprises an outlet for releasing gas.

2. The apparatus according to claim 1, further comprising a pretreatment reactor, wherein said pretreatment reactor is in fluid communication with said MBR and with said MBD; whereby said excess sludge is fed from said MBR into said pretreatment reactor in which said excess sludge is dispersed with a disperser housed in said pretreatment reactor and is fed into said MBD after dispersing.

3. The apparatus according to claim 1, wherein said submerged membrane biological reactor system (MBR) is comprised of three separated compartments, wherein a first compartment has an inlet for wastewater and is in fluid communication with said second compartment, wherein the first compartment allows removal of carbonaceous compounds and nitrification under aerobic conditions;
a second compartment allows denitrification under anoxic conditions and is in fluid communication with said third compartment; and
a third compartment providing aerobic conditions, comprises said submerged membrane having an outlet which releases permeate passed through said membrane, and said third compartment is in fluid communication with said MBD or said pretreatment reactor.

4. The apparatus according to claim 1, further comprising an element balancing reactor (EBR) for removing heavy metals from sludge circulating in said MBD,
wherein said EBR provides an inlet through which it is fed with said sludge from said MBD and an outlet through which said treated sludge of said EBR is fed back into said MBD.

5. The apparatus according to claim 4, wherein said EBR provides a further outlet for removing said heavy metals separated from said sludge of said MBD.

6. The apparatus according to claim 2, wherein said disperser in said pretreatment reactor is selected from the group consisting of an agitator and an ultrasonic transducer.

7. The apparatus according to claim 1, wherein the material for said membranes is selected from the group consisting of polymers and ceramics.

8. A process for cleaning wastewater using an apparatus according to any of the preceding claims, wherein said process comprises:
   feeding wastewater to be treated into a submerged membrane biological reactor system (MBR);
   feeding excess sludge from said MBR into a submerged membrane module (MBD);
   dispersing said excess sludge in said MBD;
   feeding permeate passed through the membrane of said MBD back into said MBR;
   releasing permeate passed through the membrane of said MBR; and
   releasing $CO_2$ produced in said MBD.

9. The process according to claim 8, further comprising:
   feeding excess sludge from said MBR into a pretreatment reactor;
   dispersing said excess sludge in said pretreatment reactor; and
   feeding said dispersed sludge from said pretreatment reactor into said MBD.

10. The process according to claim 8, further comprising
    feeding said wastewater into said first compartment of said MBR for removal of carbonaceous compounds and nitrification under aerobic conditions;
    feeding effluent from said first compartment into said second compartment of said MBR for denitrification under anoxic conditions; and
    feeding the effluent from said second compartment into said third compartment of said MBR which provides aerobic conditions and filtering said effluent from said second compartment through said membrane of said third compartment to obtain recycled water.

11. The process according to claim 9, wherein any excess sludge of said MBD is fed into an element balancing reactor for removing heavy metals from said sludge from said MBD.

* * * * *

UNITED STATES PATENT AND TRADEMARK OFFICE
CERTIFICATE OF CORRECTION

| | | |
|---|---|---|
| PATENT NO. | : 8,273,247 B2 | Page 1 of 1 |
| APPLICATION NO. | : 12/516557 | |
| DATED | : September 25, 2012 | |
| INVENTOR(S) | : Darren Delai Sun et al. | |

It is certified that error appears in the above-identified patent and that said Letters Patent is hereby corrected as shown below:

Title Page, Item (54):
"WATER RECLAMATION WITHOUT BIOSLUDGE REPRODUCTION" should read, --WATER RECLAMATION WITHOUT BIOSLUDGE PRODUCTION--.

Signed and Sealed this
Eighth Day of January, 2013

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,273,247 B2 | Page 1 of 1 |
| APPLICATION NO. | : 12/516557 | |
| DATED | : September 25, 2012 | |
| INVENTOR(S) | : Darren Delai Sun et al. | |

It is certified that error appears in the above-identified patent and that said Letters Patent is hereby corrected as shown below:

<u>Title Page, Item (54) and at Column 1, lines 1 and 2, Title</u>
"WATER RECLAMATION WITHOUT BIOSLUDGE REPRODUCTION" should read,
--WATER RECLAMATION WITHOUT BIOSLUDGE PRODUCTION--.

This certificate supersedes the Certificate of Correction issued January 8, 2013.

Signed and Sealed this
Nineteenth Day of February, 2013

Teresa Stanek Rea
*Acting Director of the United States Patent and Trademark Office*